(12) United States Patent
Bellamkonda et al.

(10) Patent No.: US 12,604,212 B2
(45) Date of Patent: Apr. 14, 2026

(54) METHOD AND SYSTEM FOR MOBILITY MANAGEMENT

(71) Applicant: Verizon Patent and Licensing Inc., Basking Ridge, NJ (US)

(72) Inventors: Krishna K. Bellamkonda, Flower Mound, TX (US); Jin Yang, Orinda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 375 days.

(21) Appl. No.: 17/497,072

(22) Filed: Oct. 8, 2021

(65) Prior Publication Data

US 2023/0110023 A1     Apr. 13, 2023

(51) Int. Cl.
*H04W 24/02* (2009.01)
*H04W 8/02* (2009.01)
*H04W 48/20* (2009.01)

(52) U.S. Cl.
CPC ............. *H04W 24/02* (2013.01); *H04W 8/02* (2013.01); *H04W 48/20* (2013.01)

(58) Field of Classification Search
CPC ..... H04W 24/02; H04W 24/10; H04W 64/00; H04W 64/003; H04W 36/00; H04W 36/0016; H04W 36/0058; H04W 36/0061; H04W 36/0064; H04W 36/0077; H04W 36/0083; H04W 36/20; H04W 36/30; H04W 36/32; H04W 8/22; H04W 8/24; H04W 8/26; H04W 76/10; H04W 76/25; H04W 76/27
See application file for complete search history.

(56) References Cited

U.S. PATENT DOCUMENTS

| | | | | |
|---|---|---|---|---|
| 9,392,471 | B1 * | 7/2016 | Thomas | H04L 41/0823 |
| 2010/0214939 | A1 * | 8/2010 | Ryan | H04W 24/08 |
| | | | | 370/252 |
| 2013/0005297 | A1 * | 1/2013 | Sanders | H04W 4/029 |
| | | | | 455/406 |
| 2014/0213257 | A1 * | 7/2014 | Ryan | H04W 36/00835 |
| | | | | 455/436 |
| 2016/0029253 | A1 * | 1/2016 | Sarkar | H04W 36/0016 |
| | | | | 455/436 |
| 2018/0070247 | A1 * | 3/2018 | Gormley | H04W 88/08 |
| 2019/0215700 | A1 * | 7/2019 | Sofuoglu | H04W 16/26 |
| 2020/0120721 | A1 * | 4/2020 | Lau | H04W 76/11 |
| 2021/0153050 | A1 * | 5/2021 | Santhanam | H04L 5/0073 |
| 2022/0198823 | A1 * | 6/2022 | Feng | H04W 24/04 |
| 2023/0189111 | A1 * | 6/2023 | Bulakci | H04W 48/18 |
| | | | | 370/331 |
| 2024/0121710 | A1 * | 4/2024 | Cheng | H04W 48/18 |

\* cited by examiner

*Primary Examiner* — Huy D Vu
*Assistant Examiner* — Scott A Schlack

(57)     ABSTRACT

A method, a device, and a non-transitory storage medium are described in which a mobility management service is provided. The service may evaluate geospatial, performance metric, and neighbor criteria data relating to overlap areas between source cells and candidate target cells. The service may calculate composite values for each candidate target cell and select the candidate target cell based on the composite value. The service may manage the mobility of end devices and associated mobility procedures on a sub-sector, sector, cell, and cluster of cell level. The service may reconfigure network devices and the end device to satisfy optimization, healing, and site planning measures.

20 Claims, 19 Drawing Sheets

600

610 — TARGET OVERLAP AREA FOR RF LEVEL (dB)

605 — SOURCE OVERLAP AREA FOR RF LEVEL (dB)

615

| SOURCE \ TARGET | ≥90 | [-91,-100] | [-101,-110] | [-111,-120] | [-121,-130] | <-130 |
|---|---|---|---|---|---|---|
| ≥90 | 5 | 4 | 3 | 2 | 1 | 5 |
| [-91,-100] | 4 | 4 | 4 | 4 | 4 | 4 |
| [-101,-110] | 3 | 3 | 3 | 3 | 3 | 3 |
| [-111,-120] | 2 | 2 | 2 | 2 | 2 | 2 |
| [-121,-130] | 1 | 1 | 1 | 1 | 1 | 1 |
| <-130 | 0 | 0 | 0 | 0 | 0 | 0 |

Fig. 6

| DEGREE OF OVERLAP | SCORE FOR SOURCE,TARGET[I] |
|---|---|
| [100,81] | 5 |
| [80,61] | 4 |
| [60,41] | 3 |
| [40,21] | 2 |
| [20,5] | 1 |
| <5 | 0 |

| TIER | SCORE FOR SOURCE.TARGET[I] |
|------|----------------------------|
| 1 | 5 |
| 2 | 4 |
| 3 | 3 |
| 4 | 2 |
| 5 | 1 |
| <5 | 0 |

805    810

800

| DISTANCE IN KM | SCORE FOR SOURCE, TARGET[I] |
|---|---|
| [0,2] | 5 |
| [2,4] | 4 |
| [4,8] | 3 |
| [8,12] | 2 |
| [12,50] | 1 |
| >50 | 1 |

905          910

900

| SIDE-HAUL LATENCY IN MS | SCORE FOR SOURCE, TARGET[I] |
|---|---|
| [0.2,2] | 5 |
| [2,8] | 4 |
| [8,16] | 3 |
| [16,50] | 2 |
| >50 | 1 |
| <5 | 0 |

1005      1010

1000

| BACKHAUL LATENCY IN MS | SCORE FOR TARGET[I] |
|---|---|
| [0.2,2] | 5 |
| [2,8] | 4 |
| [8,16] | 3 |
| [16,50] | 2 |
| >50 | 1 |

| TARGET OVERLAP AREA FOR RF QUALITY (dB) | | | | | | |
|---|---|---|---|---|---|---|
| | >1 | [5,1] | [10,5] | [15,10] | [20,15] | >20 |
| >20 | 5 | 1 | 2 | 3 | 4 | 5 |
| [20,15] | 4 | 4 | 4 | 4 | 4 | 4 |
| [15,10] | 3 | 3 | 3 | 3 | 3 | 3 |
| [10,5] | 2 | 2 | 2 | 2 | 2 | 2 |
| [5,1] | 1 | 1 | 1 | 1 | 1 | 1 |
| >1 | 0 | 0 | 0 | 0 | 0 | 0 |

SOURCE OVERLAP AREA FOR RF QUALITY (dB)

| TIME (MINUTES) | NUMBER OF CARRER COMPONENTS (CC) | | | | | |
| --- | --- | --- | --- | --- | --- | --- |
| | 6 CC | 5 CC | 4 CC | 3 CC | 2 CC | 1 CC |
| >45 | 5 | 4 | 3 | 2 | 1 | 5 |
| [30,45] | 4 | 4 | 4 | 4 | 4 | 4 |
| [15,30] | 3 | 3 | 3 | 3 | 3 | 3 |
| [5,15] | 2 | 2 | 2 | 2 | 2 | 2 |
| [1,5] | 1 | 1 | 1 | 1 | 1 | 1 |
| <1 | 0 | 0 | 0 | 0 | 0 | 0 |

| CAPACITY IN MHZ | SCORE FOR TARGET[I] |
|---|---|
| >200 | 5 |
| [100,200] | 4 |
| [50,100] | 3 |
| [10,50] | 2 |
| <10 | 1 |

| SLICE LATENCY IN MS | SCORE FOR TARGET[I]-SLICE[J] |
|---|---|
| [0.2,2] | 5 |
| [2,8] | 4 |
| [8,16] | 3 |
| [16,50] | 2 |
| >50 | 1 |

SIGNIFICANT NODE 1560-1

Autonomous vehicle path 1560

SIGNIFICANT NODE 1560-2

NONSIGNIFICANT NODE 1555-2

SIGNIFICANT NODE 1560-3

NONSIGNIFICANT NODE 1555-1

NONSIGNIFICANT NODE 1555-3

1700

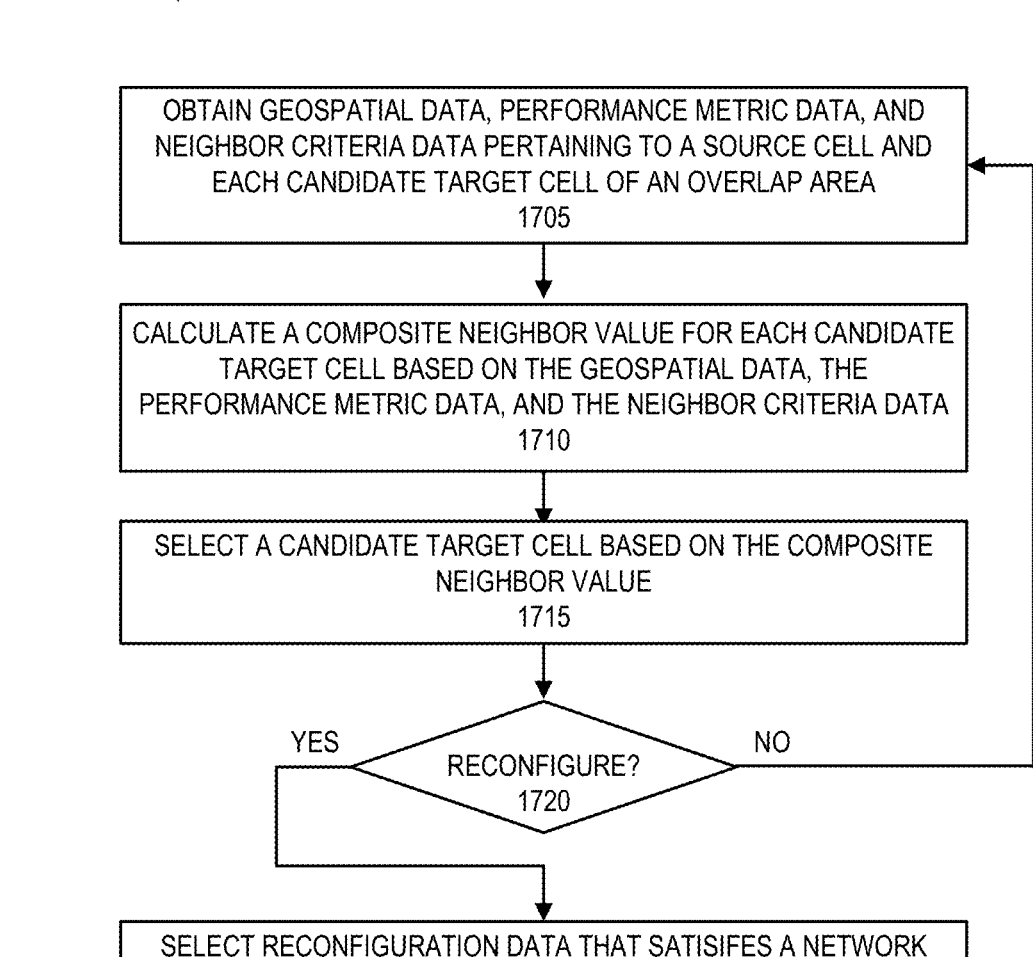

OBTAIN GEOSPATIAL DATA, PERFORMANCE METRIC DATA, AND NEIGHBOR CRITERIA DATA PERTAINING TO A SOURCE CELL AND EACH CANDIDATE TARGET CELL OF AN OVERLAP AREA
1705

CALCULATE A COMPOSITE NEIGHBOR VALUE FOR EACH CANDIDATE TARGET CELL BASED ON THE GEOSPATIAL DATA, THE PERFORMANCE METRIC DATA, AND THE NEIGHBOR CRITERIA DATA
1710

SELECT A CANDIDATE TARGET CELL BASED ON THE COMPOSITE NEIGHBOR VALUE
1715

YES       RECONFIGURE?       NO
1720

SELECT RECONFIGURATION DATA THAT SATISIFES A NETWORK POLICY
1725

PERFORM AT LEAST ONE OF AN OPTIMIZATION PROCEDURE OR A HEALING PROCEDURE BASED ON THE SELECTED CANDIDATE TARGET CELL
1730

Fig. 17

METHOD AND SYSTEM FOR MOBILITY MANAGEMENT

BACKGROUND

Development and design of networks present certain challenges from a network-side perspective and an end device perspective. For example, Next Generation (NG) wireless networks, such as Fifth Generation New Radio (5G NR) networks are being deployed and under development.

BRIEF DESCRIPTION OF THE DRAWINGS

FIGS. 6-15A are diagrams illustrating exemplary criteria used by an exemplary embodiment of the mobility management service;

FIG. 17 is a flow diagram illustrating an exemplary process of an exemplary embodiment of a mobility management service.

DETAILED DESCRIPTION

Figure 1:
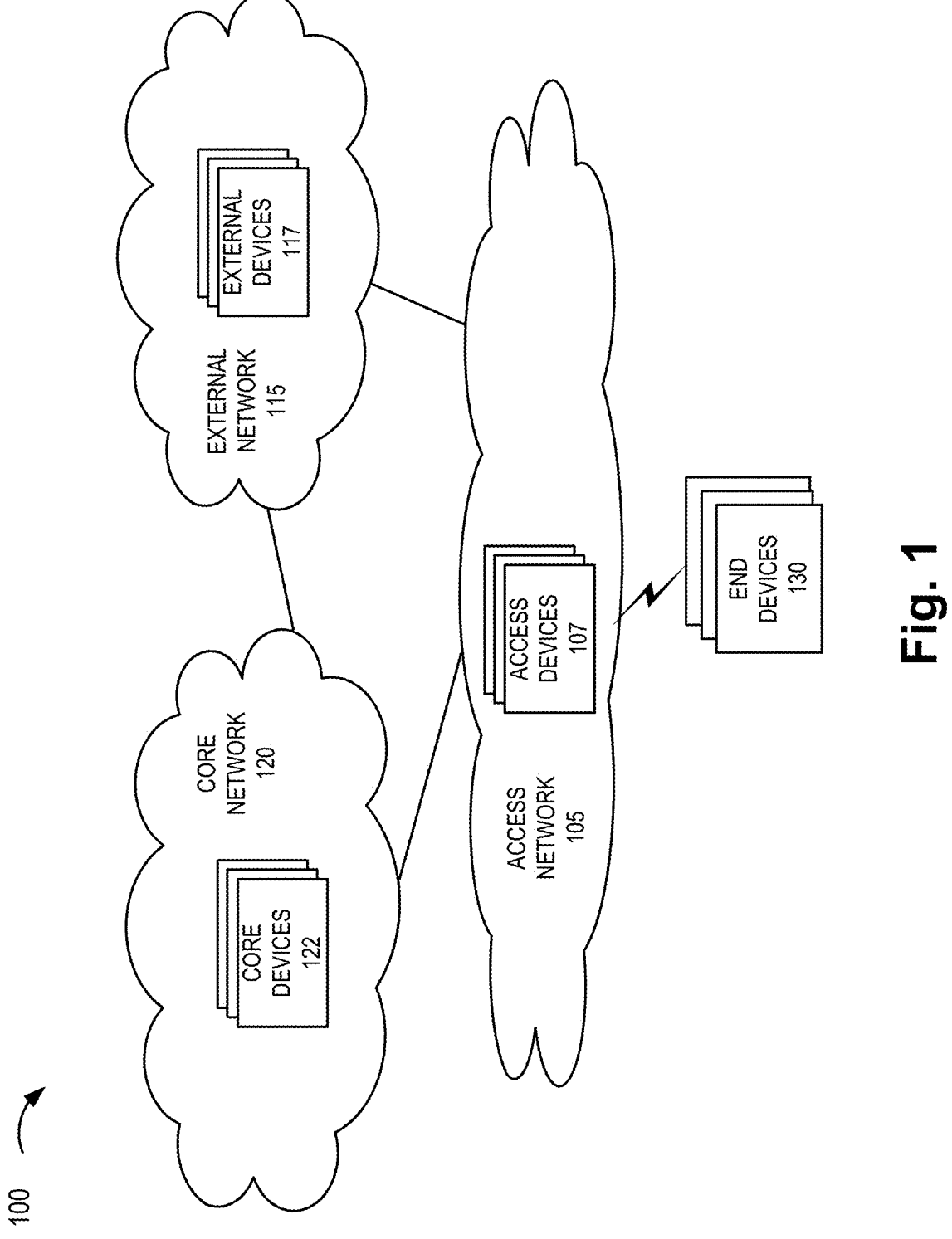
FIG. 1 is a diagram illustrating an exemplary environment in which an exemplary embodiment of a mobility management service may be implemented.

The following detailed description refers to the accompanying drawings. The same reference numbers in different drawings may identify the same or similar elements. Also, the following detailed description does not limit the invention.

The infrastructure of a wireless network, its management, and providing wireless access to application services to users in an optimal manner present various technological challenges and issues for network providers, service providers, and/or other entities of relevance. For example, the wireless network may include a variety of cells, cell types, and coverage areas, support multiple radio access technologies (RATs) and a variety of network slices, among other things, while users are to be afforded virtually unrestrained mobility to access services.

According to exemplary embodiments, a mobility management service is described. According to an exemplary embodiment, the mobility management service may be implemented to include a polymorphic algorithm-based network system. According to another exemplary embodiment, the mobility management service may be implemented to include a non-polymorphic algorithm-based network system. For example, the mobility management service may be implemented to include a network data analytics function (NDAF) or similar network device that may include network analytics, artificial intelligence, and/or machine learning logic. According to various exemplary embodiments, the mobility management service may support reactive measures, proactive measures, generate and apply data that may pertain to short term, long term, current, and prospective objectives that may be applicable to various facets of wireless network and mobility management ranging from initial planning, cell site rollouts and configurations, optimization of cells sites, and healing strategies. Additionally, the mobility management service may support these facets of wireless network and mobility management at varying levels of a wireless network infrastructure, such as a sub-sector level (also referred to as a "geo-bin), a sector level, a cell level, a cluster, or multi-cell level, and so forth.

According to an exemplary embodiment, the mobility management service may include a geospatial modeling service. The geospatial modeling service may include logic that identifies candidate target cells and associated characteristics, such as overlap zone radio frequency telemetry predictions and geospatial information relative to a source cell based on characteristics of the source cell, such as geo-coordinates, antenna and radio subsystem features, and propagation modeling features, as described herein. The geospatial modeling service may pertain to inter-frequency and intra-frequency technologies and frequencies.

According to an exemplary embodiment, the mobility management service may include a neighbor modeling service. The neighbor modeling service may include logic that may provide performance indicators for a cluster of cells, a cell, a sector of a cell, and a subsector of a sector (also referred to as a geo-bin). The performance indicators may relate to mobility, coverage, quality, capacity, inter-technology transitioning, network slicing, and/or other types of configurable performance categories. The neighbor modeling service may obtain performance indicator information from users.

According to an exemplary embodiment, the mobility management service may include a neighbor evaluating modeling service. The neighbor evaluating modeling service may create an ordered list or another type of data structure (e.g., a graph, etc.) that provides a comparative between neighbor cells, which may stem from or be based on the neighbor cells identified by the neighbor modeling service. The neighbor evaluating modeling service may use various criteria for scoring purposes, such as an RF signal value, a degree of overlap value, a geospatial overlap value, a tier value, a distance value, performance metric values, and other values that may pertain to an overlap zone between a source cell and a candidate target cell, as described herein. The neighbor evaluating modeling service may use a weighting value relative to a score value and associated criterion that may be used to calculate a composite neighbor value, as described herein.

The neighbor evaluating modeling service may provide input to various wireless network management systems, such as those pertaining to planning and configuration, optimization, and healing, as described herein. According to an exemplary embodiment, the mobility management service may generate a graph based on the composite neighbor values associated with an overlap zone (e.g., a sector or a geo-bin) between a source cell and a target cell, a cell, or a cluster of cells in which the edges between the nodes of the graph may indicate a cost value or a relational value to which the graph pertains. For example, the cost or relational value may relate to one or multiple criteria, such as a performance metric (e.g., throughput, latency, error rate, reliability, etc.) on a per-application service and/or per network slice basis.

In view of the foregoing, the mobility management service may facilitate planning, configuration, optimization, and healing measures relating to a wireless network. For example, the mobility management service may be used to influence cell selection and handover for an end device, as well as route influence on a cell-by-cell or cluster of cells level. Consequently, the mobility management service may improve the performance of application services experienced by users of end devices. Additionally, for example, the mobility management service may use the composite neighbor values for priming cell sites and cell clusters for users, identifying potential optimizations, selecting alternate target geo-bins, sectors, and cells when performance degradations and/or disruptions may occur, and evaluating cell planning and rollouts based on poorly performing coverage areas of a wireless network. Empirical data may be used to simulate the performance and impact of future cells sites and overlap zones in the wireless network based on information provided by the mobility management service.

FIG. 1 is a diagram illustrating an exemplary environment 100 in which an exemplary embodiment of mobility management service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into various types of network architectures (e.g., Software Defined Networking (SDN), virtual, logical, network slice, etc.). The number, the type, and the arrangement of network devices, and the number of end devices 130 are exemplary. For purposes of description, end device 130 is not considered a network device.

Environment 100 includes communication links between the networks, between the network devices, and between end devices 130 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the mobility management service may use at least one of these planes of communication. Additionally, an interface of a network device may be modified (e.g., relative to an interface defined by a standards body, such as Third Generation Partnership Project (3GPP), 3GPP2, International Telecommunication Union (ITU), European Telecommunications Standards Institute (ETSI), Global System Mobile Association (GSMA), and the like) or a new interface of the network device may be provided in order to support the communication (e.g., transmission and reception of messages, information elements (IE), attribute value pairs (AVPs), objects, parameters, or another form of a data instance) between network devices and the mobility management service logic of a network device and/or an end device, as described herein. According to various exemplary implementations, the interface of the network device may be a service-based interface, a reference point-based interface, an Open Radio Access Network (O-RAN) interface, a 5G interface, another generation of interface (e.g., 5.5G, 6G, 7G, etc.), or some other type of interface.

Access network 105 may include one or multiple networks of one or multiple types and technologies. For example, access network 105 may be implemented to include a 5G RAN, a future generation RAN (e.g., a sixth generation (6G) RAN, a seventh generation (7G) RAN, or a subsequent generation RAN), a centralized-RAN (C-RAN), and/or another type of access network. Access network 105 may include a legacy RAN (e.g., a third generation (3G) RAN, a 4G or 4.5 RAN, etc.). Access network 105 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105, external network 115, and/or core network 120.

Access network 105 may include different and multiple functional splitting, such as options 1, 2, 3, 4, 5, 6, 7, or 8 that relate to combinations of access network 105 and core network 120 including, for example, an evolved packet core (EPC) network and/or an 5G core network, or the splitting of the various layers (e.g., physical layer, medium access control (MAC) layer, radio link control (RLC) layer, packet data convergence protocol (PDCP) layer, and/or other layers), plane splitting (e.g., user plane, control plane, etc.), a centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher, carrier aggregation (CA), edge and core network slicing, coordinated multipoint (CoMP), various duplex schemes, and/or another type of connectivity service (e.g., non-standalone (NSA) new radio (NR), stand-alone (SA) NR, and the like).

According to some exemplary embodiments, access network 105 may be implemented to include various architectures of wireless service, such as, for example, 5G, macrocell, microcell, femtocell, picocell, metrocell, NR cell, Long Term Evolution (LTE) cell, non-cell, or another type of cell architecture. Additionally, according to various exemplary embodiments, access network 105 may be implemented according to various wireless technologies (e.g., RATs, etc.), and various wireless standards, frequencies, bands, carrier frequencies, and segments of radio spectrum (e.g., cm wave, mm wave, below 6 gigahertz (GHz), above 6 GHz, higher than mm wave, C-band, licensed radio spectrum, unlicensed radio spectrum), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a next generation Node B (gNB), an evolved LTE (eLTE) evolved Node B (eNB), an eNB, a radio network controller (RNC), a remote radio head (RRH), a baseband unit (BBU), a radio unit (RU), a centralized unit (CU), a CU control plane (CU CP), a CU user plane (CU UP), a distributed unit (DU), a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical device (e.g., modem, wired access point, optical access point, Ethernet device, etc.) that provides network access.

External network 115 may include one or multiple networks of one or multiple types and technologies. For example, external network 115 may be implemented to include a service or an application layer network, a cloud network, a private network, a public network, a MEC network, a fog network, the Internet, a packet data network (PDN), a service provider network, the World Wide Web (WWW), an Internet Protocol Multimedia Subsystem (IMS) network, a Rich Communication Service (RCS) network, an SDN, a virtual network, a packet-switched network, a data center, or other type of network that may provide access to and may host an end device application service.

Depending on the implementation, external network 115 may include various network devices such as external devices 117. For example, external devices 117 may include servers (e.g., web, application, cloud, etc.), mass storage devices, data center devices, network function virtualization (NFV) devices, containers, virtual machines (VMs), SDN devices, cloud computing devices, platforms, and other types of network devices and/or architectures pertaining to various network-related functions (e.g., security, management, charging, billing, authentication, authorization, policy enforcement, development, etc.). External network 115 may include one or multiple types of core devices 122, as described herein.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), higher user mobility (e.g., high speed train, remote computing, moving hot spots, etc.), IoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), voice, conferencing, instant messaging), video streaming, and/or other types of wireless and/or wired application services.

Core network 120 may include one or multiple networks of one or multiple network types and technologies. Core network 120 may include a complementary network of access network 105. For example, core network 120 may be implemented to include a 5G core network, an EPC of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include various types of network devices that are illustrated in FIG. 1 as core devices 122. For example, core devices 122 may include a user plane function (UPF), a Non-3GPP Interworking Function (N3IWF), an access and management mobility function (AMF), a session management function (SMF), a unified data management (UDM) device, a unified data repository (UDR), an authentication server function (AUSF), a network slice selection function (NSSF), a network repository function (NRF), a policy control function (PCF), a binding support function (BSF), a network data analytics function (NWDAF), a network exposure function (NEF), a lifecycle management (LCM) device, an application function (AF), a mobility management entity (MME), a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), a charging system (CS), and/or other types of known core devices 122 that may be omitted for the sake of brevity.

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), a service capability exposure function (SCEF) with a NEF (SCEF+

NEF), and/or other combined nodes (e.g., an HSS with a UDM and/or UDR, an MME with an AMF, etc.). Also, core devices 122 may include a split core device 122. For example, core devices 122 may include a session management (SM) PCF, an access management (AM) PCF, a user equipment (UE) PCF, and/or another type of split architecture associated with another core device 122, as described herein.

End devices 130 include a device that may have computational and/or communication capabilities (e.g., wireless, wired, optical, etc.). End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device (e.g., other type of user equipment (UE)). End device 130 may be configured to execute various types of software (e.g., applications, programs, etc.). The number and the types of software may vary among end devices 130. End devices 130 may include "edge-aware" and/or "edge-unaware" application service clients. End device 130 is not to be considered a network device, as described herein.

End device 130 may support one or multiple RATs (e.g., 4G, 5G, and/or future generation RAT) and various portions of the radio spectrum (e.g., multiple frequency bands, multiple carrier frequencies, licensed, unlicensed, mm wave, above mm wave, cm wave, etc.), various levels and genres of network slicing, DC service, CA service, and/or other types of connectivity services. Additionally, end device 130 may include one or multiple communication interfaces that provide one or multiple (e.g., simultaneous, interleaved, etc.) connections via the same or different RATs, frequency bands, carrier frequencies, network slices, and/or via another communication medium (e.g., wired, etc.). The multimode capabilities of end device 130 may vary among end devices 130.

According to an exemplary embodiment, at least a portion of access devices 107 may include mobility management service logic and an interface that supports the mobility management service, as described herein. According to some exemplary embodiments, other network devices of other types of networks (e.g., core network 120, external network 115, an X-haul network, or another type of network) may include mobility management service logic and an interface that supports the mobility management service, as described herein.

Figure 2:
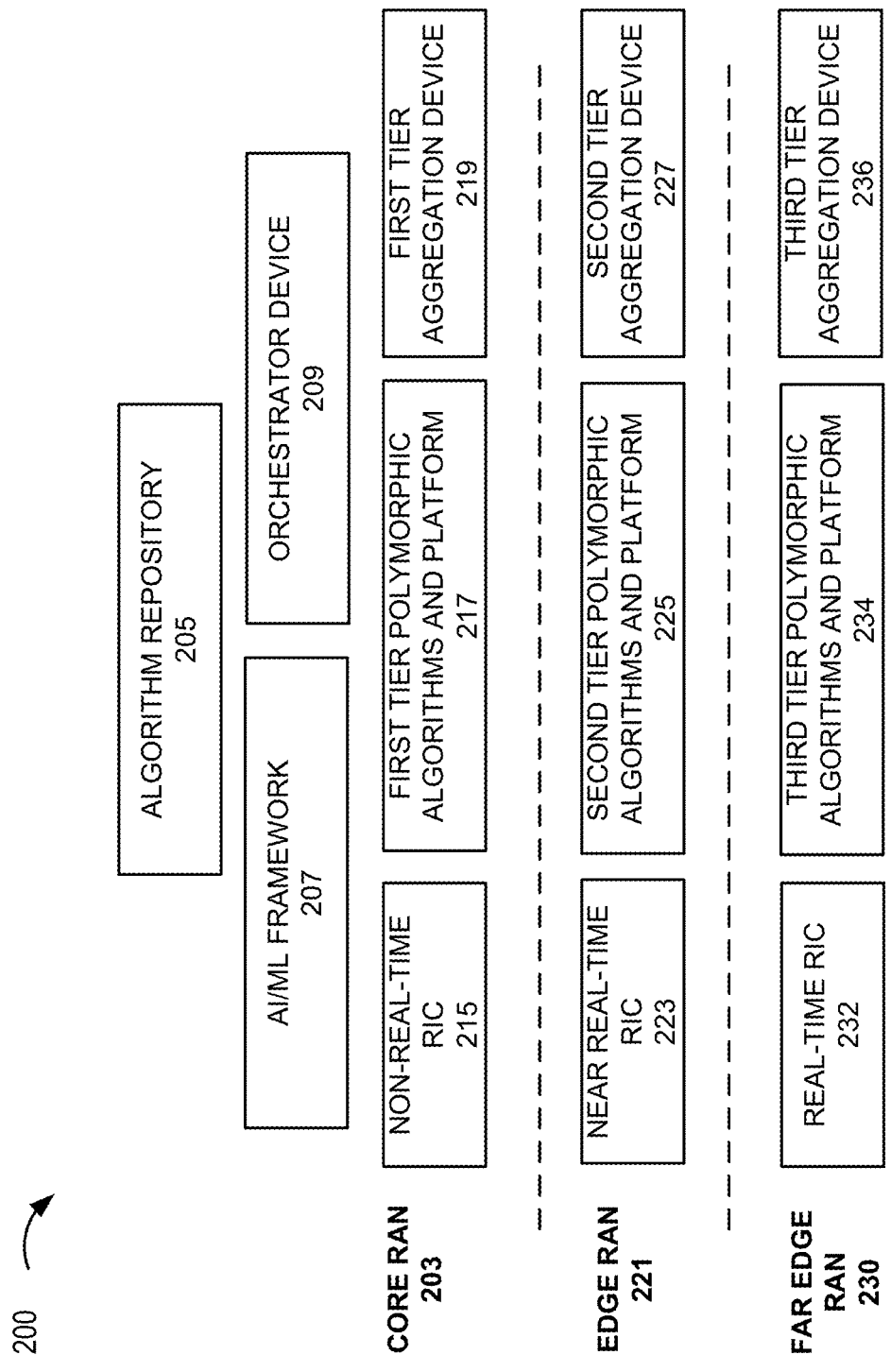
FIG. 2 is a diagram illustrating another exemplary environment in which an exemplary embodiment of the mobility management service may be implemented.

FIG. 2 is a diagram illustrating an exemplary system 200 in which an exemplary embodiment of the mobility management service may be implemented. As illustrated, system 200 may include a multi-tiered network. The multi-tiered network may include a core RAN 203, an edge RAN 221, and a far edge RAN 230. According to other examples, the multi-tiered network may include a different number of tiers (e.g., two-tiered, four-tiered, etc.), different types of tiers and/or a different type of network of a tier. For example, the multi-tiered network may include a core network tier, an external or application service layer network tier, and so forth.

As illustrated, core RAN 203 may include an algorithm repository 205, an artificial intelligence/machine learning (AI/ML) system 207, an orchestrator device 209, a non-real-time RAN Intelligent Controller (MC) 215, a first tier polymorphic algorithms and platform 217, and first tier aggregation devices 219. According to various exemplary implementations, some or all of these components may be situated in access network 105, access network 105 and core network 120, core network 120, or a different combination of networks described in relation to FIG. 1.

Algorithm repository 205 may include a network device that stores polymorphic algorithms that relate to various optimization objectives and/or performance metrics pertaining to a network and the mobility management service. The polymorphic algorithms of an optimization objective and/or performance metric may share a normalized goal function across different time granularities and associated tiers of the network. Additionally, according to an exemplary embodiment, the polymorphic algorithms of an optimization objective and/or performance metric may apply the same logic and may use the same inputs, and outputs, albeit at different time granularities. In this way, the polymorphic algorithms may operate in different tiers of the network and provide a consistent goal function, such as mobility management for end devices 130, optimization and healing measures in support of the mobility management, which may include underlying handover, cell selection, cell reselection, and route steering and/or influence directed to end devices 130, as well as future planning and configurations directed to coverage area deficiencies. Additionally, such a framework may ensure that the polymorphic algorithms may transition between tiers of a network, enable AI/ML system 207 to control sequencing of the polymorphic algorithms in terms of optimization objectives and/or performance metrics and transitioning between tiers, reduce the number of disparate algorithms (e.g., in terms of input/output, optimization logic, goal functions, etc.), and minimize the complexity for management and coordination.

To enforce algorithm singularity based on polymorphism, the polymorphic algorithms of an optimization objective and/or performance metric may include certain features pertaining to their input and their output. For example, the input of the polymorphic algorithms may include a time granularity profile that determines a tier of the network on which the polymorphic algorithm operates, a validity of profile (e.g., a duration for which the profile is valid), a goal function aggregation duration, exit criteria events, such as yield criterion (e.g., converge, diverge, performance metric of overlap geo-bin, sector, cell, and/or cluster satisfied or not, etc.), time-series criterion (e.g., transient threshold), error scenario handling, and fidelity and manifest to enable and disable. Additionally, for example, the output of the polymorphic algorithms may include a goal function scaling per network tier, a goal-to-yield realization, a self-convergence check (e.g., using ML), a self-assurance check (e.g., using ML), and an output profile format per time granularity profile.

According to an exemplary embodiment, the polymorphic algorithms may relate to the mobility management service. For example, the polymorphic algorithms may provide for different tiers of the network, the generation of underlying criteria values associated with target cell information for calculating the composite neighbor values and the generation of composite neighbor values on a per application service, network slice, and/or another configurable criterion basis.

AI/ML system 207 may include a network device that includes AI and/or ML logic. For example, AI/ML system 207 may include various learning-based and/or intelligence logic, such as reinforcement-based learning, unsupervised learning, semi-supervised learning, supervised learning, deep learning, artificial intelligence, and/or other types of device intelligence. AI/ML system 207 may analyze output data from first tier polymorphic algorithms and platform 217, second tier polymorphic algorithms and platform 225, and third tier polymorphic algorithms and platform 234 to determine whether a goal function is being met based on policies (e.g., related to thresholds, triggers, etc.) and various analytical assessments (e.g., cost function, time-series, end device telemetry information, geo-spatial information and neighbor modeling information pertaining to source and target geo-bins, sectors, cells, and clusters, mobility route guidance to end devices 130, etc.) to optimize and/or reach a performance target in relation to nodes of a tier of the network and the mobility management of end devices 130.

AI/ML system 207 may include various models directed to mobility management of end devices 130, handover between cells by end devices 130, mobility route guidance or influence for end devices 130 in view of various application services, network slices, and/or other configurable criterion of relevance.

Orchestrator device 209 may include a network device that orchestrates the polymorphic service provided by first tier polymorphic algorithms and platform 217, second tier polymorphic algorithms and platform 225, and third tier polymorphic algorithms and platform 234. Orchestrator device 209 may orchestrate virtual instances of the polymorphic algorithms at various tiers of the network, such as instantiation, deletion, suspension, transition to another tier, etc., based on feedback from AI/ML system 207, policies, and goals/cost functions pertaining to the various types of polymorphic algorithms. The policies may include tier configuration policies, which may be driven by AI/ML system 207, for selecting the polymorphic algorithm type and access devices 110, cluster of access devices 110, cell, sector, and/or sub-sector (e.g., one or multiple geo-bins). Additionally, the policies may include tier exit criterion policies. For example, the tier exit policies may include static triggers and trigger thresholds for a radio access node, a cluster of radio access nodes, or some other grouping of nodes. In this way, a threshold or a rule involving the threshold within a policy may indicate how and when a polymorphic algorithm may automatically transition from one tier to another tier of the network, for example. Orchestrator device 209 may also orchestrate virtual instances of access devices 110, core devices 122, and/or other types of network devices situated at various tiers of the network, as described herein.

Orchestrator device 209 may monitor wireless network performance (e.g., RAN, core network, and external network telemetry) at various time granularities, and may use predictive ML/AI models, polymorphic algorithms, and other information (e.g., composite neighbor values, underlying candidate target cell information, source cell information, end device information, application service and/or network slice information, context information (e.g., geographic, day and time information, etc.), and/or other types of information of relevance), as described herein, for orchestration of network resources (e.g., cell, sector, clusters or groups of network devices, etc.) in support of the mobility management service.

Orchestrator device 209 may also use radio network and core/external network optimization routines to ensure that the mobility management service is satisfying performance constraints and demands. Orchestrator device 209 may orchestrate mobility management configurations across different tiers of the network based on learned AI/ML models, and orchestrate proactive, reactive, optimal, and remedial services, for example, using polymorphic algorithms across tiers in a mutually exclusive and contention-less manner. Orchestrator device 209 in combination with other network devices (e.g., AI/ML system 207, polymorphic platforms 217, 225, 234, etc.) may ensure a consistent level of service provided to a location based on yield and goal functions, convergence, and divergence factors, among other things, associated with context, time, and tier of network.

For any given network device or group of network devices of the network, a polymorphic algorithm of the mobility management service may be active in only a single tier of the network. In this regard, for example, in a three-tiered network, the polymorphic algorithm scope for a location or a cluster of locations of the network may be mutually exclusive such that (Scope (tier 1))∩(Scope (tier 2))∩(Scope (tier 3))==Null. So, at a lowest denomination of the network (e.g., at an access device 107 level or one or multiple geo-bins), there may be only one polymorphic algorithm supervising the node from tier 1, tier 2, or tier 3 of the network. According to an exemplary embodiment, orchestrator device 209 may manage the transition of the polymorphic algorithms to operate in another tier and associated time granularity.

Non-real-time RIC 215 may control and optimize non-real-time intelligent radio resource management, QoS management, connectivity management, handover management including target cell selection and influence in access network 105 and/or core network 120 in support of the mobility management service. For example, non-real-time RIC 215 may control and optimize access devices 110 (e.g., an eNB, a DU, a gNB, etc.) associated with access network 105, core devices 122 (e.g., a UPF, a PGW, etc.), and/or network devices of an X-haul network (e.g., backhaul, fronthaul, etc.) in support of the mobility management service. First tier polymorphic algorithms and platform 217 includes network devices that host polymorphic algorithms. For example, first tier polymorphic algorithms and platform 217 may include one or multiple virtualization technologies and/or virtual network device, such as a virtualized network function (VNF), a server device, a host device, a container, a hypervisor, a virtual machine (VM), a network function virtualization infrastructure (NFVI), a network function virtualization orchestrator (NFVO), a virtual network function manager (VNFM), a platform manager and/or other types of virtualization elements, layers, hardware resources, operating systems, engines, etc. According to an exemplary embodiment, the polymorphic algorithms of the first tier may operate at a longer time granularity relative to the second tier and the third tier. First tier polymorphic algorithms and platform 217 may also have a different scope (e.g., RAN-core network edge, core network, etc.) than the scopes of the second tier and the third tier, as described herein.

First tier aggregation device 219 may include a centralized traffic aggregation device. First tier aggregation device 219 may include a RAN device (e.g., CU-User Plane (CU-UP), CU-Control Plane (CU-CP), etc.), a core device (e.g., a PGW device, a UPF device, a data network aggregation point (DNAP), etc.), and/or an external network device (e.g., a DNAP, a PGW, a UPF, etc.). First tier aggregation device 219 may include an application layer device, such as a virtual network device (e.g., a server device, a host device, a container, a VM, etc.). First tier aggregation device 219 may be configured on a per network slice and/or a per application service basis, for example.

As illustrated further illustrated, edge RAN 221 may include a near-real-time RIC 223, a second tier polymorphic algorithms and platform 225, and second tier aggregation devices 227. Near real-time RIC 223 may support near real-time intelligent radio resource management, QoS management, connectivity management, and handover management including target cell selection and influence in access network 105 in support of the mobility management service. For example, near real-time RIC 223 may control and optimize various radio resources, such as access devices 110 (e.g., an eNB, a CU, a DU, a gNB, etc.) associated with access network 105 in support of the mobility management service. Second tier aggregation device 227 may include an access device 107 of access network 105 and/or another type of network device of another type of network, as described herein. Second tier aggregation device 227 may be configured on a per network slice and/or a per application service basis, for example.

Second tier polymorphic algorithm and platform 225 includes network devices that host polymorphic algorithms. For example, second tier polymorphic algorithms and platform 225 may include one or multiple virtualization technologies, as described herein. According to an exemplary embodiment, the polymorphic algorithms of the second tier may operate at a longer time granularity relative to the third tier. Second tier polymorphic algorithms and platform 225 may also have a different scope (e.g., virtual network edge, etc.) than the scopes of the first tier and the third tier, as described herein. Second tier aggregation device 227 may include an access device 107 and/or another type of network device. Second tier aggregation device 227 may be configured on a per application basis of the mobility management service, for example.

As further illustrated, far edge RAN 230 may include a real-time RIC 232, a third tier polymorphic algorithms and platform 234, and third tier aggregation devices 236. Real-time RIC 232 may control and optimize real-time intelligent radio resource management, QoS management, connectivity management, handover management including target cell selection and influence in access network 105 in support of the mobility management service. For example, real-time RIC 232 may control and optimize various radio resources of access devices 107 (e.g., eNB, radio unit (RU), remote radio head (RRH), etc.), gNB, distributed unit (DU), etc.) of access network 105, radio resource scheduling for uplink and downlink communication with end device 130, and radio signal characteristics (e.g., modulation, beam management, etc.), and handover performance in support of the mobility management service.

Third tier polymorphic algorithms and platform 234 may include network devices that host polymorphic algorithms. For example, third tier polymorphic algorithms and platform 234 may include one or multiple virtualization technologies, as described herein. According to an exemplary embodiment, the polymorphic algorithms of the third tier may operate at a shorter time granularity relative to the first tier and the third tier. Third tier polymorphic algorithms and platform 234 may also have a different scope (e.g., virtual network far edge) than the scopes of the first tier and the third tier, as described herein.

Third tier aggregation device 236 may include a radio portion of access device 107, and/or other portions of access device 107 (e.g., baseband, x-haul, etc.). Third tier aggregation device 236 may be configured on a per network slice and/or application service basis, for example.

According to other exemplary embodiments, the mobility management service may be implemented without in whole or in part the polymorphic algorithm-based network system. For example, the mobility management service in whole or in part may be implemented by a NWDAF of core network

120. According to still other exemplary embodiments of system 200, multiple network devices may be combined into a single network device. For example, orchestrator device 209 may include AI/ML system 207 and/or algorithm repository 205. Additionally, or alternatively, a single network device may be implemented as multiple network devices in which a process or a function may be collaboratively performed or multiple processes or functions may be split between them. For example, orchestrator device 209 may be implemented to include a first orchestrator device that manages a healing service, a confirmation service, and/or an optimization service of the mobility management service, and a second orchestrator device that manages the polymorphic algorithms. Other variations of system 200 may be implemented.

Figure 3:
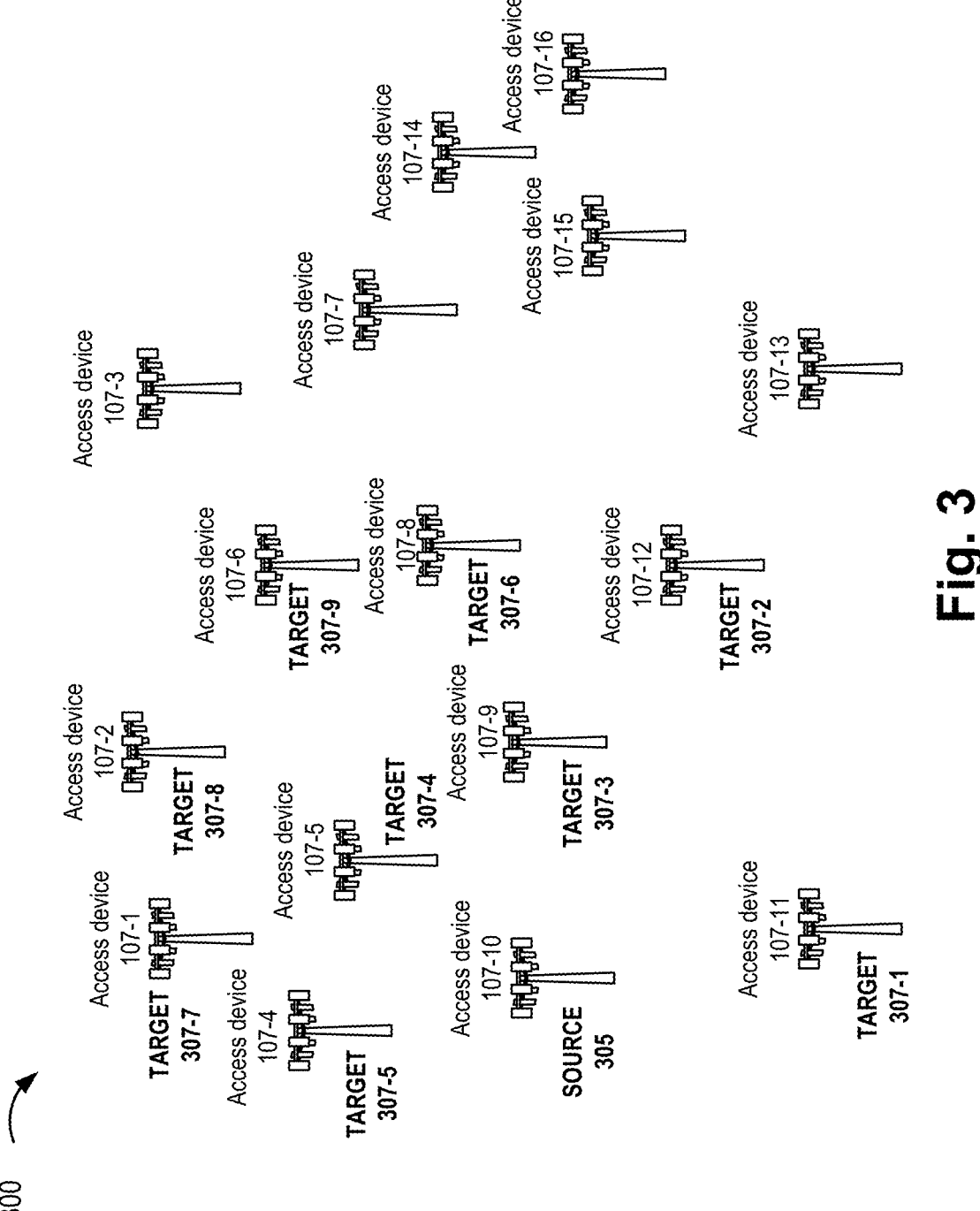
FIG. 3 is a diagram illustrating an exemplary environment that includes source and target access devices.

FIG. 3 is a diagram illustrating an exemplary environment in which an exemplary geospatial modeling process 300 of an exemplary embodiment of the mobility management service may be implemented. As illustrated, the environment may include access devices 107-1 through access devices 107-16 (also referred to as access devices 107 or individually or generally as access device 107, as previously mentioned). Additionally, as illustrated, according to an exemplary embodiment of the geospatial modeling service process, one of access devices 107 may be selected or designated as a source 305, which may be used as an input to the geospatial modeling service, and one or multiple access devices 107 may be considered a target 307. According to this example, FIG. 3 illustrates target 307-1 through target 307-9 (also referred to as targets 307 or individually or generally as target 307). The number and arrangement of access devices 107, source 305, and target 307 are exemplary.

The geospatial modeling process 300 may include obtaining geolocation and characteristic data pertaining to access device 107-10 (source 305). For example, the geolocation and characteristic data may include geographic coordinates of access device 107-10, such as latitude and longitude, and perhaps other geographic data (e.g., elevation). The geolocation and characteristic data may include information pertaining to components of access device 107-10, such as the antenna system (e.g., antenna height (vertical, horizontal), antenna type (e.g., mechanical, electrical, array, etc.), azimuth, number of transmitters, number of receivers, tilt of antenna, etc.), the radio subsystem (e.g., transmit power, receiver sensitivity, center frequency, bandwidth, etc.), propagation information (e.g., cell range, regulatory data of relevance), context information (e.g. modality, morphology, and topography information pertaining to site location, amount/frequency of usage, characteristics of traffic/users, etc.). The geolocation and characteristic data may pertain to inter-RAT, intra-RAT, inter-frequency, and/or intra-frequency aspects of source 305/access device 107-10.

Figure 4:
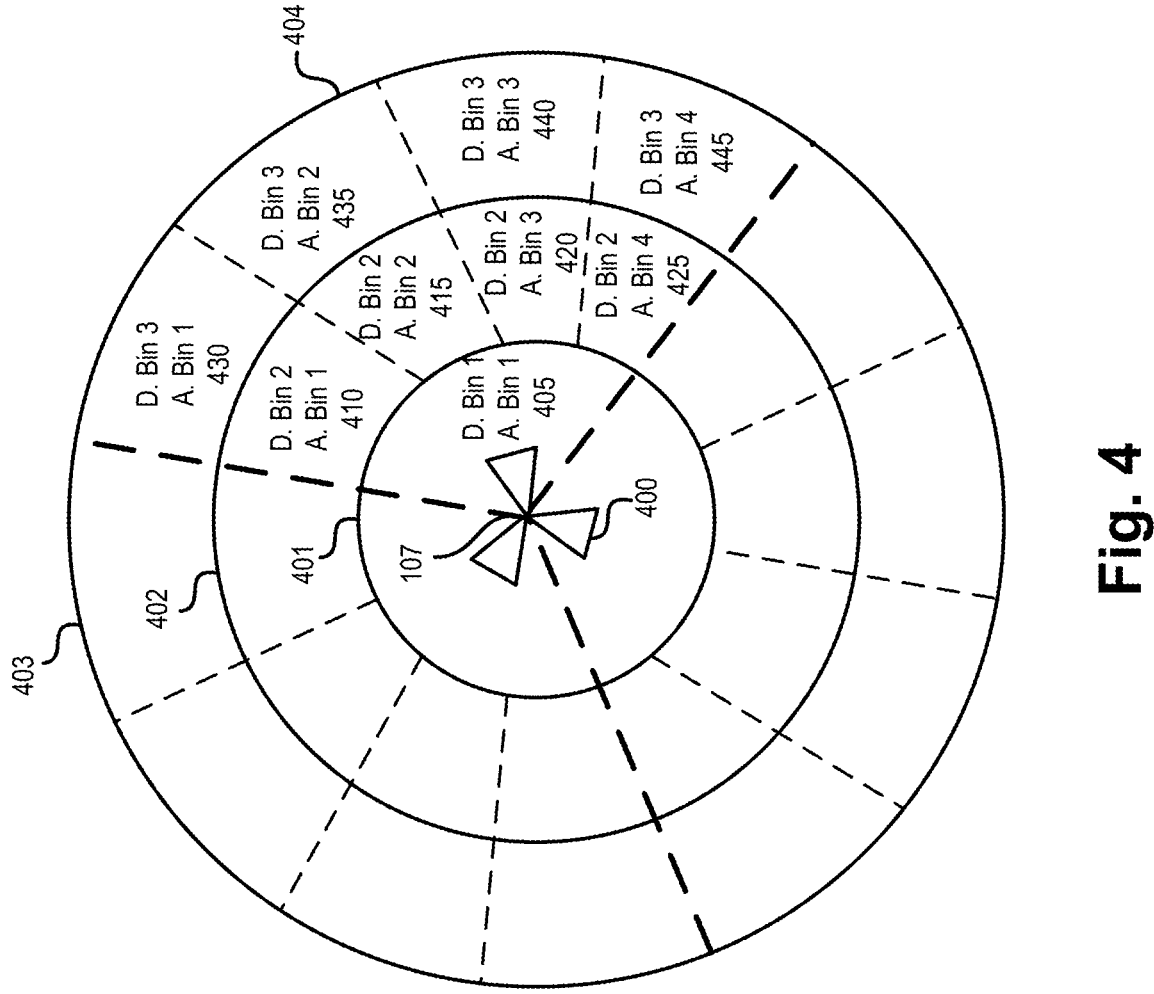
FIG. 4 is a diagram illustrating an exemplary radio coverage area.
Figure 4:

Referring to FIG. 3, the geospatial modeling process 300 may include identifying target(s) 307 relative to source 305 for mobility of end device 130. As described herein, an area of wireless service provided by source access device 107 may also be subject to wireless service coverage by one or multiple target access devices 107 (referred to as an overlap area or zone), as described further in relation to FIG. 5. According to various circumstances, the overlap area may correspond to a geo-bin, a sector, total cell coverage area, or another area of coverage, for example. For example, referring to FIG. 4, an exemplary wireless coverage area of access device 107 is depicted. According to this example, access device 107 may include a tertiary antenna system 400 that may provide wireless service in three sectors (in a geometric sense). Referring to a sector 404, sector 404 may be divided in sub-areas. According to this example, as illustrated by concentric circles 401, 402, and 403, a sub-area may be identified based on its distance and angle relative to access device 107/antenna system 400. For example, as illustrated and moving outward from access device 107 in sector 404, FIG. 4 illustrates distance bins (D. Bin) 1, 2, and 3, and in a clockwise manner, angular bins (A. Bin) 1, 2, 3, and 4. While different configurations, sizes, shapes, etc., of the coverage area of access device 107 may differ in practice, for the sake of description, an overlap area of source 305 may correspond to one or multiple of the bins, sectors, cell coverage area, or another type of area (e.g., in terms of size, shape, etc.) in relation to one or multiple target(s)/access device(s) 107.

Figure 5:
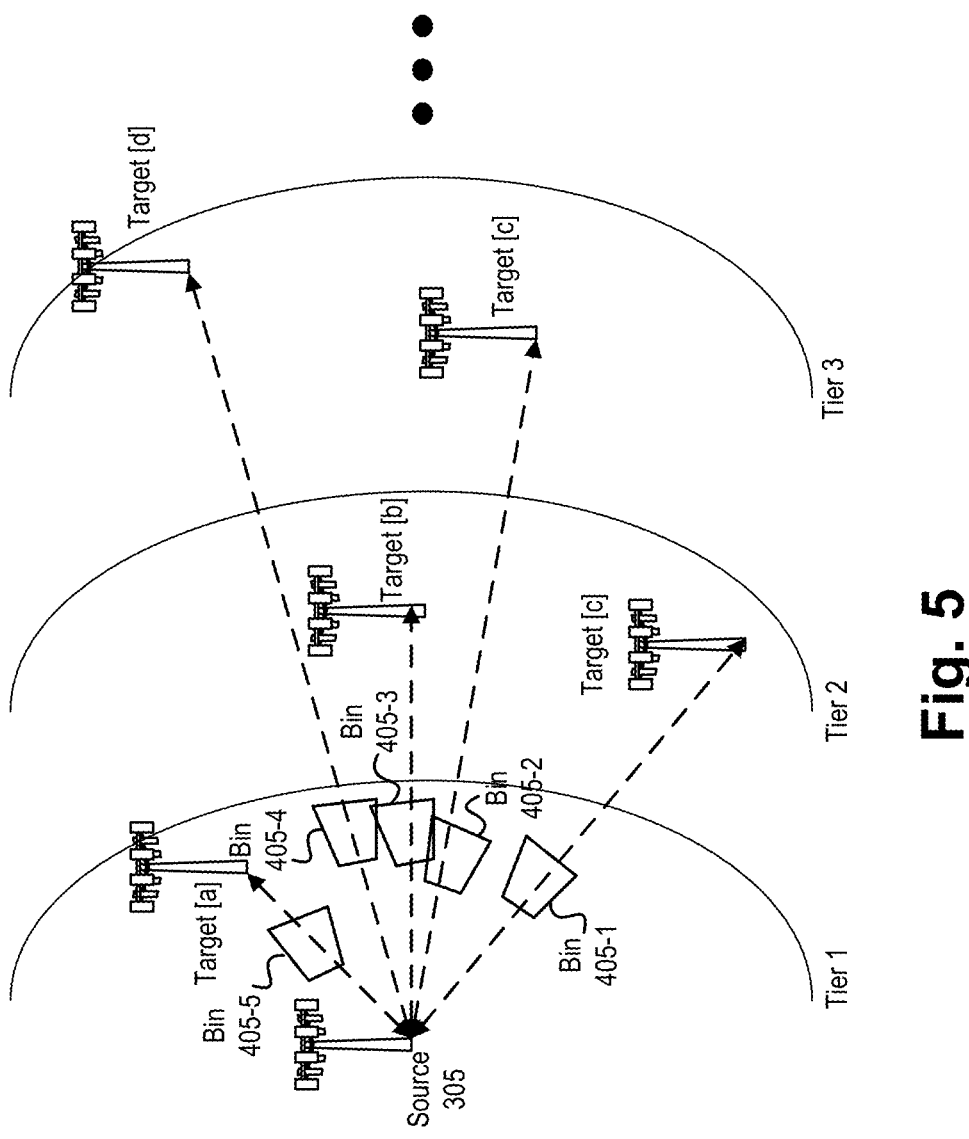
FIG. 5 is a diagram illustrating exemplary overlap areas in an exemplary environment.
Figure 5:

According to an exemplary embodiment, the geospatial modeling process 300 may output candidate target cells based on source cell input information. For example, the output information may include source-target pairings that may include overlap area RF telemetry prediction information. For example, the overlap area RF telemetry prediction information may include source-target Rx signal level/Hertz, target-source Rx signal level/Hertz, source-transmit power/Hertz, target-transmit power/Hertz, and a pathloss value. The output information may also include geospatial-relational information. For example, the geospatial-relational information may include tier, distance, degree of overlap value (e.g., percentage, etc.), and latency values relating to X-haul networks (e.g., backhaul, fronthaul, sidehaul, etc.). FIG. 5 illustrates the tier and distance aspects of the output information. For example, various targets, such as targets [a]-[d] may be a distance x (e.g., measured in feet, meters, or other unit of measure) from source 305. According to an exemplary implementation, the distance x between source 305 and a target access device 107 may be categorized under a more general category of tier. Referring to FIG. 5, an exemplary number of tiers are depicted as tier 1, tier 2, and tier 3. That is, for example, a target access device 107 that may be within a range of distance i–distance j may be categorized as a tier 1 target, while another target access device 107 that may be within a range between distance k–distance l may be categorized as a tier 2 target. As further illustrated, despite the varying distances and tiers that a target access device 107 may be associated with, a common coverage area may be shared between source 305 and a target, as illustrated by geo-bins 405-1 through 405-5. As previously explained, the overlap area between access devices 107 (e.g., source-target pairs) may be a geo-bin, a sector, the entire cell coverage area, or another form (e.g., shape, size, etc.) of a geographic area, as described herein.

According to an exemplary embodiment, the mobility management service may include the neighbor modeling service that may provide performance indicators for a cluster of cells, a cell, a sector of a cell, and a subsector of a sector (also referred to as a geo-bin). The performance indicators may relate to mobility, coverage, quality, capacity, inter-technology transitioning, network slicing, and/or other types of configurable performance categories. For example, mobility performance information may include data pertaining to the number of inter-RAT sessions (e.g., 5G NSA, etc.), the number of inter-cell type sessions, the number of co-sector transitions, the number of inter-frequency and intra-frequency handovers, and the number of blind redirections. The coverage and quality performance information may include data pertaining to a reference signal received power (RSRP) mean, a reference signal received quality (RSRQ) mean, a channel quality indicator (CQI) mean, an uplink (UL) power headroom mean, an UL physical uplink shared channel (PUSCH) signal-to-noise ratio (SINR) mean, an UL physical uplink control channel SINR mean, percentage of samples of different transmit modes (e.g., 1, 2, etc.), and/or other data pertaining to coverage and/or quality. The capacity performance information may include total carrier aggregation duration, total downlink (DL) volume, total UP volume, DL throughput mean, UL throughput mean, and/or other capacity-related values. The inter-technology transitioning performance information may include data relating to secondary gNB addition attempts, addition failures, cell change attempts, cell change failures, drops, modification attempts, modification failures, and/or other aspects that may measure performance of 5G NSA, for example. The network slicing performance information may include data pertaining to the number of unique end device identifiers (e.g., international mobile subscriber identity (IMSI), subscription permanent identifier (SUPI), etc.), the number of sessions, the number of good sessions, the number of failed sessions, the number of mobile sessions, the number of static and/or indoor sessions, the number of originations, the number of terminations, the number of sessions with a particular quality of service (QoS) class identifier (QCI), such as a single QCI (e.g., the number of session with QCI 1) or a set of QCIs (e.g., the number of sessions with two or more of QCIs 1, 8, or 9). The QCI values may include 1-9, as well as other QCI values, such as 65, 66, 67, 75, and so forth. The network slicing performance information may also include data indicating the number of Voice over LTE E-RAB attempts, failed attempts, and/or drops, the mean of radio resource control (RRC) duration, and/or other values or aspects pertaining to network slice performance. The performance indicator parameters and values may be obtained from end device 130 located in an overlap area over a time period and may relate to an application service, as described herein. Additionally, for example, the performance indicator parameters and values may be obtained from access devices 107, core devices 122, and/or network performance management systems, NWDAF, and the like.

The neighbor modeling service may obtain performance indicator information, which may pertain to a given geographic area (e.g., geo-bin, sector, etc.), from end devices 130/users of end devices 130. For example, referring to FIG. 4, the neighbor modeling service may obtain performance indicator information relating to each of the geo-bins depicted in FIG. 4 (e.g., geo-bin 405, geo-bin 410, etc.), performance indicator information relating to sector 404, the entire cell, and so forth. The neighbor modeling service may also calculate performance indicator information relative to a larger geographic region, such as a cluster of cells/access devices 107, and so forth.

According to an exemplary embodiment, the mobility management service may include a neighbor evaluating modeling service. The neighbor evaluating modeling service may create an ordered list or another type of data structure (e.g., a graph) that provides a comparative between neighbor cells, which may stem from or be based on access devices 105/cells identified by the neighbor modeling service. The neighbor evaluating modeling service may use various criteria for evaluation and assignment of values that may pertain to a candidate target cell. The neighbor evaluating modeling service may use a weighting value relative to a score value and associated criterion to calculate a composite neighbor value, as described herein.

FIGS. 6-15 are diagrams illustrating exemplary criteria that may be used according to an exemplary embodiment the neighbor evaluating modeling service. The number, the type, and aspects of the criteria (e.g., range of values indicative of a level associated with a criterion, etc.) are exemplary. According to other exemplary embodiments, additional, different, and/or fewer criteria may be used. According to various exemplary embodiments, the values associated with a criterion may be measured or predicted. The values or scores that may correlate to the criteria, as illustrated in FIGS. 6-15 are also exemplary. For the sake of description, neighbor evaluation information is illustrated in FIGS. 6-15 in tabular form. However, other data structures (e.g., different types of lists, etc.), various types of databases, and the like may be implemented. According to various exemplary embodiments, the neighbor evaluation information may be static or dynamic. For example, criteria ranges and/or score values may be static or dynamic based on day and/or time, application service, network slice, geographic coordinates of source/target cells, and/or other types of configurable factors. According to some exemplary embodiments, the values or scores may be normalized.

FIG. 6 is a diagram illustrating exemplary RF level data between a source cell and a target cell. As illustrated, exemplary RF level data 600 may include criteria fields 605 and 610 that each includes data that indicates different ranges of signal levels (e.g., expressed in decibel per milliwatt (dBm)) and value fields 615 that include score values that correlate to the different criteria pertaining to an overlap area associated with a source cell and a candidate target cell.

FIG. 7 is a diagram illustrating exemplary degree of overlap data between a source cell and a target cell. As illustrated, exemplary overlap data 700 may include a criteria field 705 that includes data that indicates different degrees of overlap (e.g., expressed in percentages) and a value field 710 that includes score values that correlate to the different degrees of overlap.

Figure 8:

FIG. 8 is a diagram illustrating exemplary tier data between a source cell and a target cell. As illustrated, exemplary tier data 800 may include a criteria field 805 that includes data that indicates different geospatial tiers (e.g., as explained in relation to FIG. 5) and a value field 810 that incudes score values that correlate to the different tiers pertaining to the candidate target cell relative to the source cell.

Figure 9:

FIG. 9 is a diagram illustrating exemplary distance data between a source cell and a target cell. As illustrated, exemplary distance data 900 may include a criteria field 905 that includes data that indicates different ranges of distances expressed in a unit of measure for distance (e.g., kilometer (km)) and a value field 910 that includes score values that correlate to the different ranges of distance pertaining to the candidate target cell relative to the source cell.

Figure 10:

FIG. 10 is a diagram illustrating exemplary side-haul latency data between a source cell and a target cell. As illustrated, exemplary side-haul latency data 1000 may include a criteria field 1005 that includes data that indicates different ranges of latency expressed in a unit of time (e.g., milliseconds (ms)) and a value field 1010 that includes score values that correlate to the different latencies. There may be various latencies of which side-haul latency may be evaluated. In this regard, the neighbor evaluating model service may evaluate and calculate various latencies based on multiple tables or other type of data structures, databases, and the like. For example, there may be a source cell-to-candidate target cell network latency. According to another example, if a source cell is not active, there may be cells in the vicinity that may have characteristics similar to the site under consideration (e.g., in terms of geo-coordinates and azimuth, side-haul fabric to the source etc.). Additionally, or alternatively, there may be a latency that is specific to a network slice. For example, the side-haul latency data 1000 (or another similarly structured table, for example) may pertain to target cell-network slice latency. In a similar manner, side-haul latencies may be correlated to different score values.

FIG. 11 is a diagram illustrating exemplary backhaul latency data between a source cell and a target cell. As illustrated, exemplary backhaul latency data 1100 may include a criteria field 1105 that includes data that indicates different ranges of latency expressed in a unit of time (e.g., ms) and a value field 1110 that includes score values that correlates to the different latencies. There may be various latencies of which backhaul latency may be evaluated. In this regard, the neighbor evaluating model service may evaluate and calculate various latencies based on multiple tables or other type of data structures, databases, and the like. For example, there may be a source-core latency and a candidate target cell-core network latency. According to some exemplary embodiments, the backhaul latency data 1100 may pertain to the candidate target cell-core network latency. Additionally, or alternatively, there may be a latency that is specific to a network slice. For example, the backhaul latency data 1100 (or another similarly structured table, for example) may pertain to target cell-network slice latency. In a similar manner, backhaul latencies may be correlated to different score values.

FIG. 12 is a diagram illustrating exemplary RF quality data between a source cell and a target cell. As illustrated, exemplary RF quality data 1200 may include criteria fields 1205 and 1210 that each includes data that indicates different ranges of signal quality (e.g., expressed in dB) and value fields 1215 that include score values that correlate to the different criteria pertaining to an overlap area associated with a source cell and a candidate target cell.

FIG. 13 is a diagram illustrating exemplary carrier aggregation data between a source cell and a target cell. As illustrated, exemplary carrier component (cc) data 1300 may include criteria fields 1305 that includes data that indicates different ranges of time (e.g., expressed in minutes) pertaining to the amount of time spent for carrier aggregation in relation to a candidate target cell and a source cell. Criteria fields 1310 include data that indicates different numbers of carrier components (e.g., ranging from 1-6). Value fields 1315 include score values that correlate the time spent for different number of carrier components for carrier aggregation in the overlap area of the source cell and the candidate target cell.

FIG. 14 is a diagram illustrating exemplary capacity data of a target cell. As illustrated, exemplary capacity data 1400 may include a criteria field 1405 that includes data that indicates different ranges of capacity (e.g., expressed in megahertz (MHz)) and a value field 1410 that includes score values that correlate to the different capacities.

FIG. 15A is a diagram illustrating exemplary network slice latency data between a target cell and a network slice pairing. As illustrated, exemplary slice latency data 1500 may include a criteria field 1505 that includes data that indicates different ranges of network slice latencies expressed in a unit of time (e.g., ms) and a value field 1510 that includes score values that correlate to the different network slice latencies.

The neighbor evaluating modeling service may calculate a composite neighbor value based on the score values, as described herein. For example, the composite neighbor value may be calculated based on the exemplary expression:

$$\text{Target composite value}[i]=\text{criterion score}(1)+\text{criterion score}(2) \tag{1},$$

in which for each target cell (i), wherein i=1 . . . n, the scores for the applicable criteria may be totaled.

According to another exemplary implementations, the composite neighbor value may be calculated based on the exemplary expression:

$$\text{Target composite value}[i]=(w1)\text{criterion score}(1)+(w2)\text{criterion score}(2) \tag{2},$$

in which weighted values (e.g., w1, w2, etc.) may be applied to one or more of the criterion scores that may be used. Additionally, according to some exemplary embodiments, the weighted value for the same criterion may differ depending on the application of the composite neighbor value. As previously mentioned, the composite neighbor value may be applied to aspects of wireless network and mobility management, such as optimization, healing, or cell planning/rollout, for example. In this regard, a weight value for the criterion of tier may differ depending on whether the composite neighbor value is being applied to optimization, healing, or cell planning measures.

According to another exemplary implementations, the composite neighbor value may be calculated based on the exemplary expression:

$$\text{Target composite value}[i]=(w1)\text{criterion score}(1)+(w2)\text{criterion score}(2) \tag{2},$$

in which weighted values (e.g., w1, w2, etc.) may be applied to one or more of the criterion scores that may be used. Additionally, according to some exemplary embodiments, the weighted value for the same criterion may differ depending on the application of the composite neighbor value. As previously mentioned, the composite neighbor value may be applied to aspects of wireless network and mobility management, such as optimization, healing, or cell planning/rollout, for example. In this regard, a weight value for the criterion of tier may differ depending on whether the composite neighbor value is being applied to optimization, healing, or cell planning measures.

According to yet another exemplary embodiment, the composite neighbor value may be calculated based on the exemplary expression:

$$\text{Target composite value}[i,\text{slice}j]=\text{criterion score}(1)+\text{criterion score}(2) \tag{3},$$

in which the composite value relates to target cell (i) and a network slice j, wherein j=1 . . . m. Further, other exemplary expressions may be implemented that uses weighted values. For example, in relation to expression (3), the weight profiles may differ based on different network slices and/or categories of traffic. For example, for some network slices and/or types of traffic supported by some network slices, performance metrics relating to latency or throughput, or another type of criterion (e.g., distance, tier, carrier aggregation, degree of overlap, etc.) may be more important than for other network slices and/or other types of traffic. The weighted values may also be implemented in a manner that influences the mobility (e.g., cell (re)selection, handover, etc.) aspects for end devices 130. Further, the composite neighbor values may change over time, be based on different time granularities (e.g., every 1 minute versus over a 24 hour time period, or another configurable time period), and different geographic levels (e.g., sector, geo-bin, cluster of cells, etc.).

According to an exemplary embodiment, the mobility management service may rank the composite neighbor values among multiple candidate target cells or overlap areas, for example. For example, the mobility management service may generate a list that indicates a precedence or priority of a candidate target cell over one or multiple other candidate target cells. The mobility management service may make selections based on the ranking or precedence of the candidate target cell for purposes of mobility management optimizations (e.g., selection of target cell for a handover, route or path steering on a hop-by-hop or cluster basis, etc.) pertaining to end device 130. The mobility management service may influence cell selection and a path of an end device 130 using offset values pertaining to radio measurements (e.g., Srxlev (cell selection RX level value), Squal (cell selection quality value), RSRP, RSRQ, etc.) performed by end device 130, and/or other reconfiguration data that may relate to influencing RAT selection, mode (e.g., SA versus NSA), and/or other aspects of a wireless connection. For example, end device 130 or access device 107 may be configured to apply an offset value to radio measurements for cell selection or reselection. End device 130 may be reconfigured via control plane signaling, for example. Alternatively, for example, access devices 107 may be reconfigured to facilitate a mobility procedure, as described herein. As a result, directed or forced handovers may be performed that align with the analytics of the mobility management service.

The mobility management service may generate multiple lists that may depend on different criteria, such as latency, throughput, network slice-based, etc. Additionally, for example, the mobility management service may generate a list that relates to healing measures. For example, target cells that may be equivalent to or exceed (e.g., in terms of one or multiple criteria) that of a disabled cell may be implemented. Alternatively, for example, target cells may be ranked from worse to best (e.g., in terms of performance or another metric) for purposes of identifying prospective cell planning.

According to other exemplary embodiments, the mobility management service may generate graphs in which nodes may be representative of target cells or overlap zones and the edges of the graphs may be representative of a cost value or a relational value to which the graph pertains. For example, the cost or relational value may relate to one or multiple criteria, such as a performance metric (e.g., throughput, latency, error rate, reliability, etc.) on a per-application service and/or per network slice basis. As such, different topologies may be built based on the graphs in which the cells are the nodes, the cells may have weights, and the edges of the graphs may have costs. The modeled data may be solved using known algorithms that evaluate the graphs to find the lowest cost for a network slice, a most relevant path for end device 130, and/or various options within a particular cluster of cells, for example.

Figure 15B:
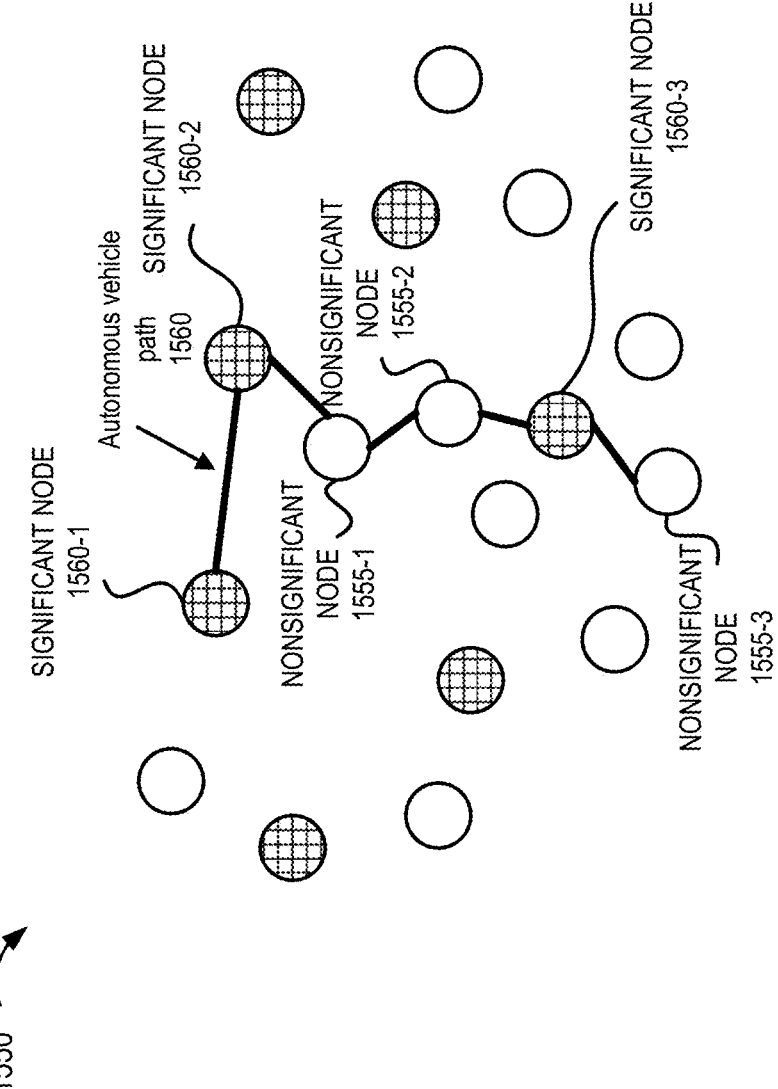
FIGS. 15B and 15C are diagrams illustrating an exemplary process of an exemplary embodiment of a mobility management service.
Figure 15C:
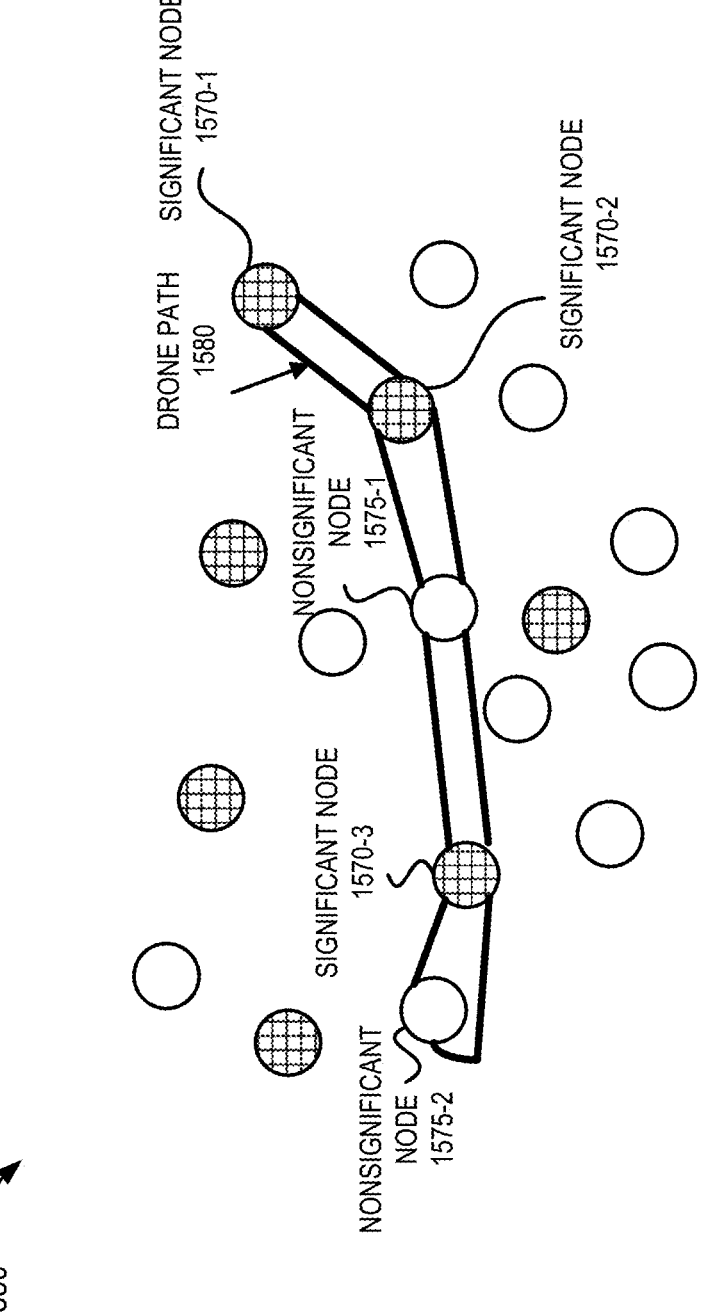

FIGS. 15B and 15C are diagrams illustrating an exemplary process 1550 of an exemplary embodiment of the mobility management service. For example, referring to FIG. 15B, an exemplary environment is illustrated that includes cells or access devices 107. The mobility management service may identify clusters of cells of relevance and key or significant sectors of access devices 107 based on attributes pertaining to context, such as mobility, traffic, and/or other criteria, as described herein in relation to neighbor services. For example, as illustrated in FIG. 15B, the mobility management service may identify significant nodes 1560-1 through 1560-3 and non-significant nodes 1555-1 and 1555-2. The mobility management service may build a graph based on the key sectors within the cluster(s), with the edges of the graph being defined as the weight of the relation. The weight of the relation may pertain to a network slice, a traffic load, and/or another type of context, for example. Also, the mobility management service may build path graphs around the key sectors via other neighbor access devices 107 for various use cases, which may relate to traffic requirements, network slices, and/or other criteria as described herein, for example. As an example, as illustrated in FIG. 15B, a path graph, such as an autonomous vehicle path 1560, may be generated that affords a high throughput for a connected vehicle. According to another example, as illustrated in FIG. 15C, a drone path 1580 may be generated that affords a low latency path for drones. With reference to FIG. 15C, the mobility management service may identify significant nodes 1570-1 through 1570-3 and nonsignificant nodes 1575-1 and 1575-2 and may generate the graph around the key or significant nodes. The mobility management service may generate a path graph, such as drone path 1580, based on the generated graph. According to other examples, a path graph may include only significant nodes, a different number of nodes, or a different number of significant and non-significant nodes. Thus, the path graphs illustrated are merely exemplary. Additionally, according to other example, a path graph may be generated based on criteria, performance metrics, etc., other than throughput and/or latency.

According to various exemplary embodiments, cell selection/reselection, handover, and path/route influence may be implemented on a single-hop basis and/or on a larger geographic view standpoint, such as on a cluster basis in which a prospective route or path across multiple cells on behalf of end device 130 may be determined. For example, on a cluster of cells basis, according to an exemplary embodiment, the mobility management service may identify cell significance. By way of further example, consider a group of 10 cells that may constitute a cluster of cells in which 3 of the 10 cells may serve a majority of drone traffic. According to an exemplary implementation, the significant cells may be prioritized over other cells within the cluster for purposes of mobility management. The mobility management service may create multiple paths, by way of different graphs for example, which may involve the significant cells. The mobility management service may consider other aspects of the wireless network, such as load balancing, various performance metrics (e.g., latency, etc.), the degree of mobility for end device 130 (e.g., cell is along a highway, etc.), and so forth. Historical data pertaining to network use by end device 130 may be considered in generating the graphs. In this way, the mobility management service may create a repository of graphs, which may relate to certain criteria and costs, for example, a priori, that may allow their use in various mobility management scenarios and facets, such as optimization, healing, cell planning, and so forth. Additionally, the mobility management service may use the lists or graphs, for example, in relation to optimization, healing, cell planning and configuration activities in a proactive or reactive manner.

Figure 16:
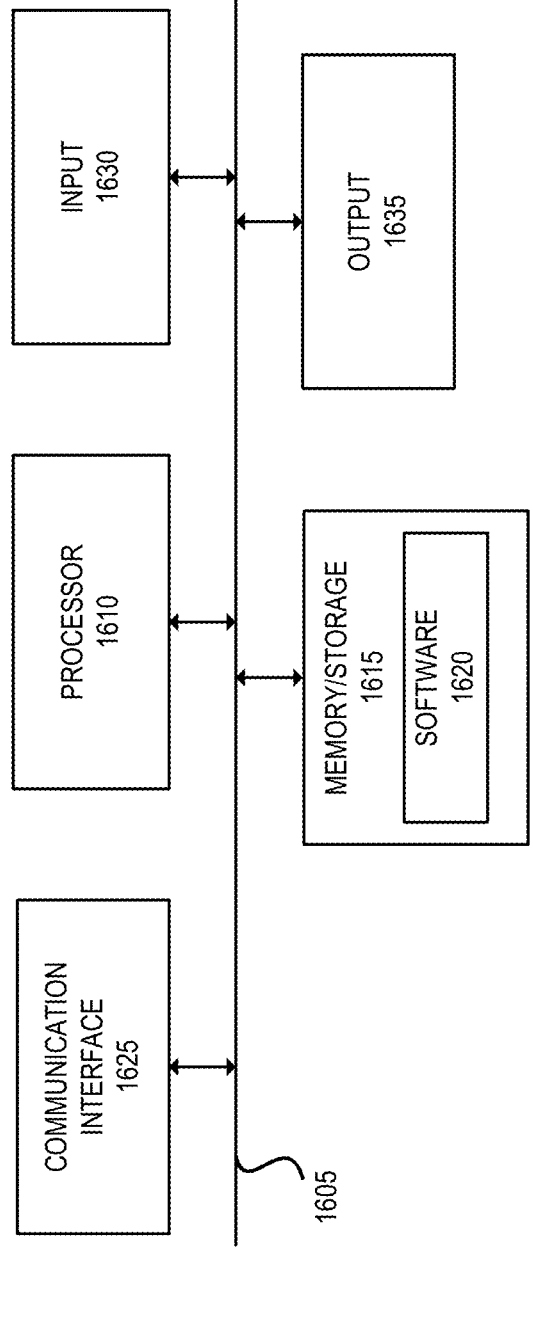
FIG. 16 is a diagram illustrating exemplary components of a device that may correspond to one or more of the devices illustrated and described herein.

FIG. 16 is a diagram illustrating exemplary components of a device 1600 that may be included in one or more of the devices described herein. For example, device 1600 may correspond to access device 107, external device 117, core device 122, end device 130, different devices of system 200 (e.g., AI/ML framework 207, orchestrator device 209), and/or other types of devices, as described herein. As illustrated in FIG. 16, device 1600 includes a bus 1605, a processor 1610, a memory/storage 1615 that stores software 1620, a communication interface 1625, an input 1630, and an output 1635. According to other embodiments, device 1600 may include fewer components, additional components, different components, and/or a different arrangement of components than those illustrated in FIG. 16 and described herein.

Bus 1605 includes a path that permits communication among the components of device 1600. For example, bus 1605 may include a system bus, an address bus, a data bus, and/or a control bus. Bus 1605 may also include bus drivers, bus arbiters, bus interfaces, clocks, and so forth.

Processor 1610 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 1610 may be implemented as hardware (e.g., a microprocessor, etc.), a combination of hardware and software (e.g., a SoC, an ASIC, etc.), may include one or multiple memories (e.g., cache, etc.), etc.

Processor 1610 may control the overall operation, or a portion of operation(s) performed by device 1600. Processor 1610 may perform one or multiple operations based on an operating system and/or various applications or computer programs (e.g., software 1620). Processor 1610 may access instructions from memory/storage 1615, from other components of device 1600, and/or from a source external to device 1600 (e.g., a network, another device, etc.). Processor 1610 may perform an operation and/or a process based on various techniques including, for example, multithreading, parallel processing, pipelining, interleaving, learning, model-based, etc.

Memory/storage 1615 includes one or multiple memories and/or one or multiple other types of storage mediums. For example, memory/storage 1615 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 1615 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 1615 may be external to and/or removable from device 1600, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 1615 may store data, software, and/or instructions related to the operation of device 1600.

Software 1620 includes an application or a program that provides a function and/or a process. As an example, with reference to various network devices of system 200, software 1620 may include an application that, when executed by processor 1610, provides a function and/or a process of the mobility management service, as described herein. Software 1620 may also include firmware, middleware, microcode, hardware description language (HDL), and/or other form of instruction. Software 1620 may also be virtualized.

Software 1620 may further include an operating system (OS) (e.g., Windows, Linux, Android, proprietary, etc.).

Communication interface 1625 permits device 1600 to communicate with other devices, networks, systems, and/or the like. Communication interface 1625 includes one or multiple wireless interfaces and/or wired interfaces. For example, communication interface 1625 may include one or multiple transmitters and receivers, or transceivers. Communication interface 1625 may operate according to a protocol stack and a communication standard. Communication interface 1625 may include various processing logic or circuitry (e.g., multiplexing/de-multiplexing, filtering, amplifying, converting, error correction, application programming interface (API), etc.). Communication interface 1625 may be implemented as a point-to-point interface, a service-based interface, or a reference interface, for example.

Input 1630 permits an input into device 1600. For example, input 1630 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 1635 permits an output from device 1600. For example, output 1635 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 1600 may be implemented in the same manner. For example, device 1600 may be instantiated, created, deleted, or some other operational state during its life-cycle (e.g., refreshed, paused, suspended, rebooting, or another type of state or status), using well-known virtualization technologies.

Device 1600 may perform a process and/or a function, as described herein, in response to processor 1610 executing software 1620 stored by memory/storage 1615. By way of example, instructions may be read into memory/storage 1615 from another memory/storage 1615 (not shown) or read from another device (not shown) via communication interface 1625. The instructions stored by memory/storage 1615 cause processor 1610 to perform a function or a process described herein. Alternatively, for example, according to other implementations, device 1600 performs a function or a process described herein based on the execution of hardware (processor 1610, etc.).

FIG. 17 is a flow diagram illustrating an exemplary process 1700 of an exemplary embodiment of mobility management service. According to an exemplary embodiment, system 200 and/or a NWDAF (referred to as system 200 in relation to FIG. 17) may perform a step of process 1700. According to an exemplary implementation, processor 1610 may execute software 1620 to perform the step of process 1700, as described herein. Alternatively, the step may be performed by execution of only hardware.

In block 1705, system 200 may obtain geospatial data relating to source and candidate target cells, as described herein. System 200 may also obtain performance metric data that may relate to an overlap area between the source cell and the candidate target cell, as described herein. For example, the performance metric data may pertain to mobility, coverage, quality, capacity, inter-technology transitions, network slices, and/or other aspects of the overlap area. The performance metric data may be provided by end devices 130 and network devices of a wireless network that relates to the overlap area, as described herein. System 200 may further obtain neighbor criteria data that relate to criteria for evaluating target cells, as described herein. For example, the neighbor criteria data may include criteria pertaining to distance between source and target cells, tiers, capacity, and so forth, as described herein.

In block 1710, system 200 may calculate a composite neighbor value for each candidate target cell based on the geospatial, performance metric, and neighbor criteria data, as described herein. For example, system 200 may calculate the composite neighbor value based on expression (1), (2), (3), or another expression, as described herein.

In block 1715, system 200 may select a candidate target cell based on the composite neighbor value. For example, system 200 may rank or identify candidate target cells based on their respective composite neighbor values. System 200 may select one or a subset of candidate target cells based on a current or predictive state of the wireless network (e.g., a geo-bin, a sector, a coverage of a cell, a cluster of cells, etc.), as described herein. System 200 may select one or a subset of candidate target cells based on current or predictive position of end device 130. System 200 may rank and/or select one or a subset of candidate target cells based on one or multiple objectives or goals, as described herein.

In block 1720, system 200 may determine whether to reconfigure a network device and/or end device 130. For example, system 200 may determine whether an objective or a network policy of the wireless network and associated overlap area, cell, or cluster of cells is currently or prospectively satisfied. System 200 may evaluate current configurations and/or current or prospective states of the relevant portion of the wireless network. The current configurations and/or current or prospective states may relate to performance metrics pertaining to traffic, handover, a network slice, or an application service associated with end device 130, access device 107, and/or core device 122 of relevance to the overlap area or proximate wireless coverage area (e.g., cell coverage area, cluster of cells, etc.).

When system 200 determines to not reconfigure (block 1720—NO), process 1700 may return to block 1705. For example, when system 200 may determine that current configurations satisfy the objective or network policy, system 200 may opt to not reconfigure.

When system 200 determines to reconfigure (block 1720—YES), system 200 may select reconfiguration data that achieves the policy (block 1725). For example, system 200 may adjust the configuration of end device 130, access device 107, and/or core device 122. System 200 may select the reconfiguration data based on learned models, machine learning, and artificial intelligence logic, as described herein.

In block 1730, system 200 may perform at least one of an optimization procedure or a healing procedure based on the selected candidate target cell. For example, system 200 may proactively or reactively configure end device 130, access device 107 (e.g., a cell, a sector, etc.) and/or core device 122 of relevance in a manner that facilitates the objective pertaining to an optimization measure or a healing measure. By way of further example, the optimization may relate to influencing cell selection/re-selection, handover, and/or route/path influence of end device 130. For example, offset values may be used to influence end device 130 and/or access device 107 behavior in relation to these mobility procedures. Alternatively, for example, system 200 may configure and influence these mobility procedures to fulfill a healing objective. For example, system 200 may identify an underperforming or disabled cell or sector and perform a healing procedure that re-routes end device 130 (e.g., in terms of handover, cluster cell level route or rerouting optimization, etc.) to accommodate end devices 130 that may be negatively impacted. As described herein, system 200 may perform the optimization and/or healing procedure from a cell or single hop perspective or a cluster or route/path perspective in which a concatenation of target cells may be contemplated for end device 130 to use during its mobility. The optimization and/or healing procedures may be directed to different types of end devices 130, different types of traffic/application services, different types of network slices, performance metrics (e.g., latency, throughput, etc.), and/or other criteria, as described herein.

FIG. 17 illustrates an exemplary embodiment of a process of mobility management service, according to other exemplary embodiments, the mobility management service may perform additional operations, fewer operations, and/or different operations than those illustrated and described. For example, system 200 may perform at least some steps of process 1700 for site planning and rollout measures, as described herein.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described regarding the process illustrated in FIG. 17, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 1610, etc.), or a combination of hardware and software (e.g., software 1620).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 1610) of a device. A non-transitory storage medium includes one or more of the storage mediums described in relation to memory/storage 1615. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:

obtaining, by a network device, geospatial data, performance metric data, and neighbor criteria data pertaining to a source cell and each candidate target cell of an overlap area relative to the source cell;

calculating, by the network device, a composite neighbor value on a per application and network slice basis for each candidate target cell based on the geospatial data, the performance metric data, and the neighbor criteria data, wherein the composite neighbor value comprises multiple criterion scores regarding a same performance metric at different geographic tiers including a cluster of cells, a cell, a sector of the cell, and a geo-bin that pertains to each candidate target cell;

selecting, by the network device, at least one candidate target cell based on at least one composite neighbor value of the at least one candidate target cell;

selecting, by the network device, reconfiguration data based on a network policy pertaining to a mobility procedure and the at least one candidate target cell, wherein the reconfiguration data includes an offset value pertaining to a signal measurement to be performed by an end device of the at least one candidate target cell; and performing, by the network device, a procedure that includes reconfiguring the end device pertaining to the mobility procedure with the reconfiguration data.

2. The method of claim 1, wherein the overlap area includes at least one geo-bin area of a sector coverage area of an access device.

3. The method of claim 1, wherein the mobility procedure includes a cell selection procedure, a cell reselection procedure, or a handover procedure.

4. The method of claim 1, wherein the geospatial data indicates the overlap area between the source cell and each candidate target cell, and wherein the performance metric data includes performance metric values from end devices located in the overlap area over a time period.

5. The method of claim 1, wherein the neighbor criteria data includes data indicating a degree of overlap between the source cell and each candidate target cell, a radio frequency signal value, and a network slice latency relative to each target candidate cell.

6. The method of claim 1, further comprising:

ranking, by the network device, each candidate target cell based on each composite neighbor value, and wherein the selecting the at least one candidate target cell is based on the ranking.

7. The method of claim 1, wherein the reconfiguration data includes data that influences radio access technology (RAT) selection.

8. The method of claim 1, further comprising:

determining, by the network device based on the network policy and a current or prospective state of a radio access network, that the end device is to be reconfigured.

9. A network device comprising:

a processor configured to:

obtain geospatial data, performance metric data, and neighbor criteria data pertaining to a source cell and each candidate target cell of an overlap area relative to the source cell;

calculate a composite neighbor value on a per application and network slice basis for each candidate target cell based on the geospatial data, the performance metric data, and the neighbor criteria data, wherein the composite neighbor value comprises multiple criterion scores regarding a same performance metric at different geographic tiers including a cluster of cells, a cell, a sector of the cell, and a geo-bin that pertains to each candidate target cell;

select at least one candidate target cell based on at least one composite neighbor value of the at least one candidate target cell;

select reconfiguration data based on a network policy pertaining to a mobility procedure and the at least one candidate target cell, wherein the reconfiguration data includes an offset value pertaining to a signal measurement to be performed by an end device of the at least one candidate target cell; and perform a procedure that includes reconfiguring the end device pertaining to the mobility procedure with the reconfiguration data.

10. The network device of claim 9, wherein the overlap area includes at least one geo-bin area of a sector coverage area of an access device.

11. The network device of claim 9, wherein the mobility procedure includes a cell selection procedure, a cell reselection procedure, or a handover procedure.

12. The network device of claim 9, wherein the geospatial data indicates the overlap area between the source cell and each candidate target cell, and wherein the performance metric data includes performance metric values from end devices located in the overlap area over a time period.

13. The network device of claim 9, wherein the neighbor criteria data includes data indicating a degree of overlap between the source cell and each candidate target cell, a radio frequency signal value, and a network slice latency relative to each target candidate cell.

14. The network device of claim 9, wherein the processor is further configured to:

rank each candidate target cell based on each composite neighbor value, and wherein the processor is further configured to select the at least one candidate target cell based on a ranking.

15. The network device of claim 9, wherein the processor is further configured to:

determine, based on the network policy and a current or prospective state of a radio access network, that the end device is to be reconfigured.

16. The network device of claim 9, wherein the reconfiguration data includes data that influences radio access technology (RAT) selection.

17. A non-transitory computer-readable storage medium storing instructions executable by a processor of a network device, wherein the instructions are configured to:

obtain geospatial data, performance metric data, and neighbor criteria data pertaining to a source cell and each candidate target cell of an overlap area relative to the source cell;

calculate a composite neighbor value on a per application and network slice basis for each candidate target cell based on the geospatial data, the performance metric data, and the neighbor criteria data, wherein the composite neighbor value comprises multiple criterion scores regarding a same performance metric at different geographic tiers including a cluster of cells, a cell, a sector of the cell, and a geo-bin that pertains to each candidate target cell;

select at least one candidate target cell based on at least one composite neighbor value of the at least one candidate target cell;

select reconfiguration data based on a network policy pertaining to a mobility procedure and the at least one candidate target cell, wherein the reconfiguration data includes an offset value pertaining to a signal measurement to be performed by an end device of the at least one candidate target cell; and perform a procedure that includes reconfiguring the end device pertaining to the mobility procedure with the reconfiguration data.

18. The non-transitory computer-readable storage medium of claim 17, wherein the mobility procedure includes a cell selection procedure, a cell reselection procedure, or a handover procedure.

19. The non-transitory computer-readable storage medium of claim 17, wherein the overlap area includes at least one geo-bin area of a sector coverage area of an access device.

20. The non-transitory computer-readable storage medium of claim 17, wherein the instructions further comprise instructions configured to:

determine, based on the network policy and a current or prospective state of a radio access network, that the end device is to be reconfigured.

\* \* \* \* \*